Nov. 11, 1958

C. MERIAM 2,859,956

LIQUID FLOW RECORDER

Filed April 27, 1956

INVENTOR.
CHARLES MERIAM
BY
Christie, Parker & Hale
ATTORNEYS

Nov. 11, 1958        C. MERIAM        2,859,956

LIQUID FLOW RECORDER

Filed April 27, 1956        2 Sheets-Sheet 2

INVENTOR.
CHARLES MERIAM
BY
Christie, Parker & Hale
ATTORNEYS ns patent office 2,859,956
Patented Nov. 11, 1958

2,859,956

LIQUID FLOW RECORDER

Charles Meriam, San Marino, Calif.

Application April 27, 1956, Serial No. 581,116

5 Claims. (Cl. 265—8)

This invention relates to apparatus for recording liquid flow, and more particularly for recording the flow of liquid into a container.

While the apparatus may be employed to record liquid flow in general, it is especially suitable as a portable medical instrument for recording the rate at which a patient discharges urine. This information, taken from time to time, is a valuable aid in medical diagnosis and treatment of prostate gland trouble, and the like. The apparatus is arranged so that a patient may operate it with ease. This is desirable because discharge of urine is more normal if done in privacy. In order for the patient to operate the apparatus, it is desirable that the operation of the machine be automatic. This is achieved in accordance with the present invention by causing the operation of the apparatus to be controlled automatically by the flow of urine.

The apparatus of the invention includes weight sensitive means for supporting a container which receives the liquid, the weight sensitive means providing a changing mechanical deflection in accordance with the increasing amount of liquid received in the container. Means are included for driving a chart on which liquid flow is to be recorded, and writing means responsive to the deflection provided by the weight sensitive means is employed for recording liquid flow on the chart.

The invention is explained in detail with reference to a preferred embodiment illustrated in the accompanying drawings, in which.

Figure 1:
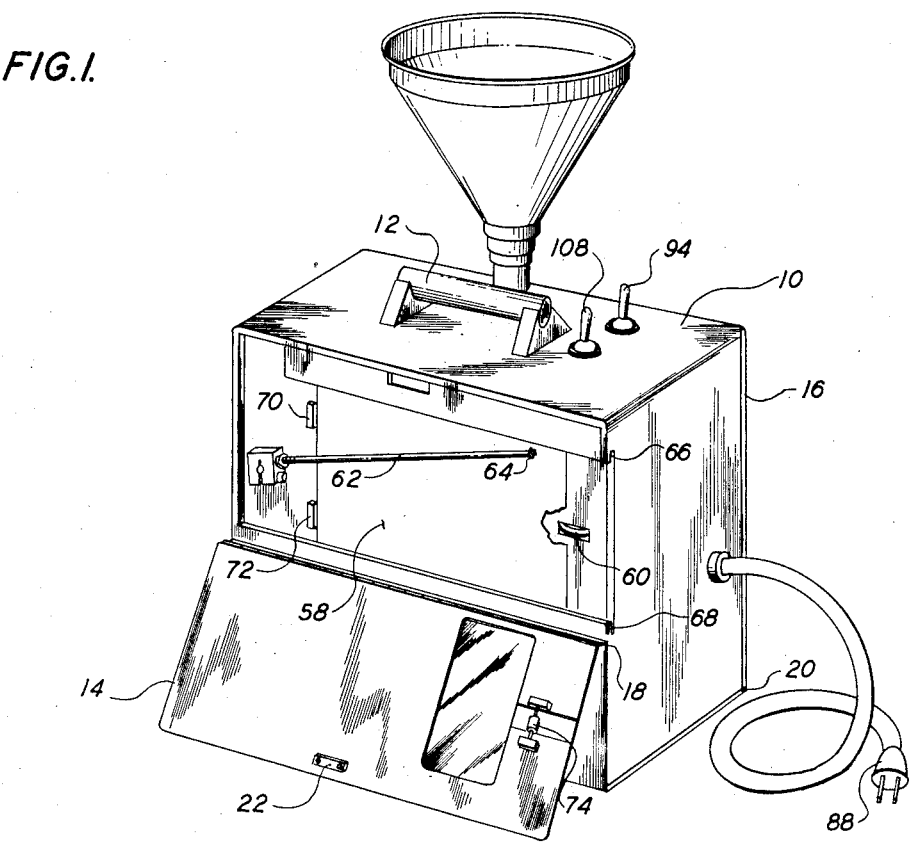
Fig. 1 is a front perspective view of a preferred embodiment of the invention especially suitable for medical use.
Figure 2:
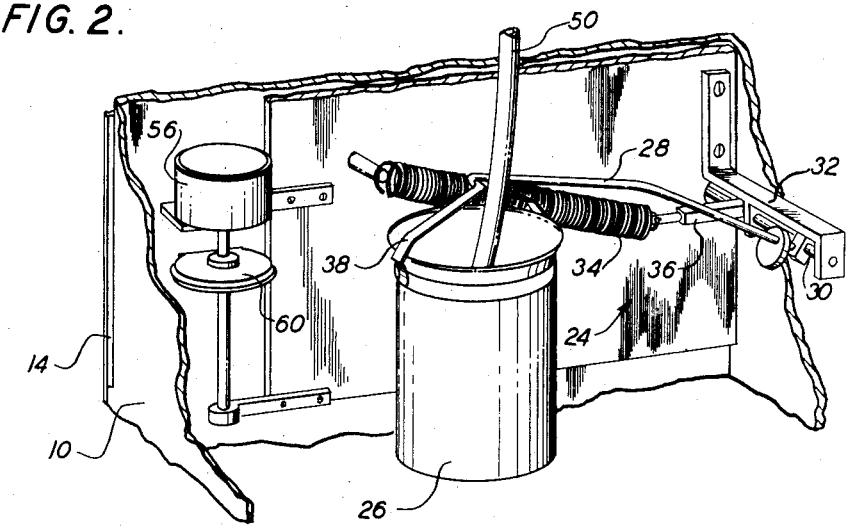
Fig. 2 is a fragmentary rear perspective drawing of a portion of the apparatus of Fig. 1.
Figure 3:
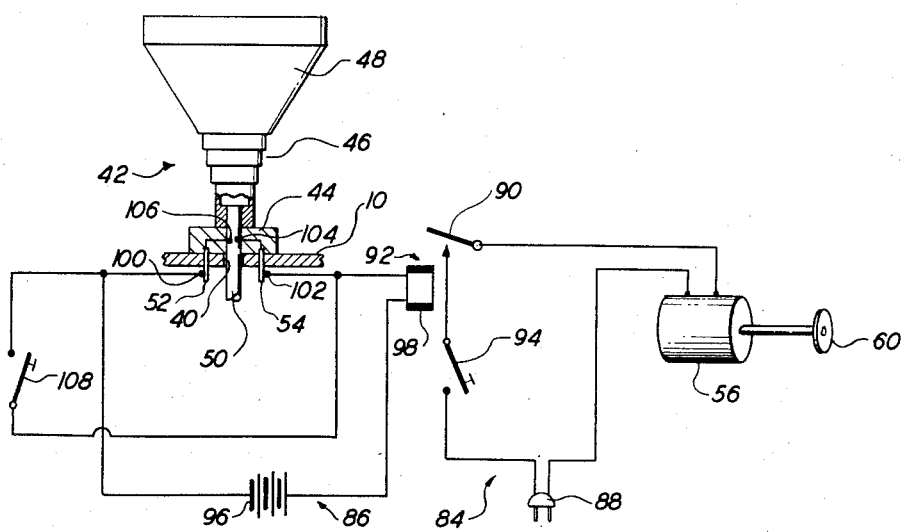
Fig. 3 is a schematic drawing of the electrical circuitry of the apparatus of Fig. 1.

Referring now specifically to Figs. 1, 2 and 3, the preferred embodiment of the invention includes a portable case 10, the case having a handle 12, a front lid 14 and a back lid 16. The lids are hinged to the case as shown at 18 and 20, and they are each adapted to be secured in the closed position by a magnetic latch such as shown at 22. Being the housing of a portable medical instrument, the case is preferably made of light weight plastic which is stain resistant so that it is sanitary and easily cleaned.

Weight sensitive means 24 is mounted in the case for releasably supporting a container 26 which receives the liquid. The weight sensitive means includes a lever 28 rigidly connected to a shaft 30, the shaft being rotatably coupled to a supporting frame 32, and the supporting frame in turn being connected to the case. The lever is loaded in the upward direction by a spring 34 which is coupled between the case and a secondary lever 36, the secondary lever being rigidly connected to the shaft 30.

The container 26 has a handle 38, so that the container may be hung and detached at will on the end of the lever 28. As liquid enters into the container, its weight causes the lever 28 to pivot downwardly against the action of the spring 34, thereby producing a rotation of the shaft 30 in accordance with the increasing amount of liquid received in the container. The back lid 16 of the case may be opened in order to remove and empty the container when necessary.

The case has an opening 40 (Fig. 3) for admitting the fluid, and a funnel structure 42 is releasably supported to the case for channeling the fluid through said opening and into the container 26. The funnel structure includes a base portion 44, a telescoping portion 46, a collector portion 48, and a flexible tube 50. The tube communicates through the base portion 44 and extends to the container 26.

The funnel structure 42 is releasably connected to the case 10 by means of a pair of conductive bayonets 52, 54 which extend from the base portion 44. These bayonets plug into accommodating socket openings in the case 10 in a conventional manner, as shown, and provide a releasable connection so that the funnel structure can be conveniently detached from the case for cleaning. The telescoping portion 46 of the funnel structure provides a convenient height adjustment of the collector portion 48 for the accommodation of the person providing the urine specimen, and also provides for collapsing the funnel structure so that it does not interfere with the portability of the case.

An electric motor 56 is mounted in the case for driving a chart 58 on which liquid flow is to be recorded. The motor turns a rubber tired wheel 60 at a substantially constant speed, and the periphery of the wheel extends through a portion of the case for engaging the chart by friction.

A writing arm 62 is coupled at one end of the shaft 30. The arm has a small wheel 64 mounted at its opposite end for tracing out a record on the chart 58 in response to rotation of the shaft 30 by the weight sensitive structure.

A pair of ways 66, 68 are formed in the front face of the case 10 for slidably receiving the card or chart 58 on which the liquid flow is to be recorded. Stops 70, 72 are provided to position the initial placement of the chart 58 along the length of the ways. An idler roller 74 is rotatably mounted to the front lid 14, and when the lid is closed, the idler roller presses the chart against the friction wheel 60. When the motor is energized, the chart then will be travelled at a substantially constant speed along the ways.

Figure 8:
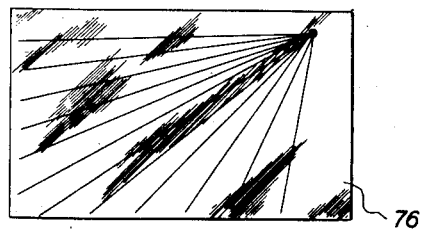
Fig. 8 is a drawing of a transparent overlay for evaluating the record shown on the chart of Fig. 4.
Figure 4:
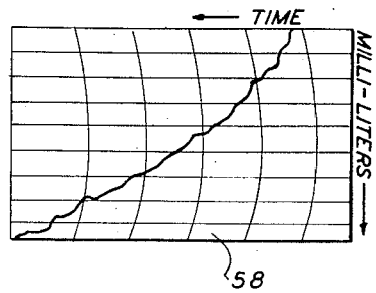
Fig. 4 is a drawing of a preferred wax coated chart for use in the apparatus of Fig. 1.

Fig. 4 depicts the chart 58 separate from the rest of the apparatus, and illustrates a typical record as would be made by a healthy person. The weight sensitive structure and the chart are preferably calibrated so that the record reads in milliliters received in the container versus time. As shown in Fig. 8, a transparent overlay 76 may be permanently marked with suitable lines, so that by placing the transparent overlay over the chart 48, the line nearest approximating the line on the chart may be chosen. Each of the lines on the overlay 76 preferably is labeled with a number representing a rate of urine discharge. The particular line chosen then represents the average rate of urine discharge for the patient in evaluating a record.

Figure 7:
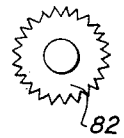
Fig. 7 is a plan view of an alternate embodiment of the writing means portion shown in Fig. 5.
Figure 5:
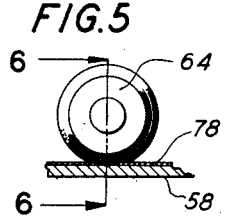
Fig. 5 is a fragmentary sectional elevation of a portion of the writing means of Fig. 1 in contact with a portion of the wax coated chart.
Figure 6:
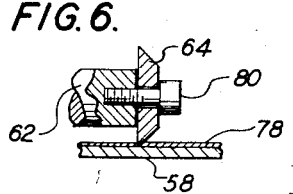
Fig. 6 is a view taken along line 6—6 of Fig. 5.

As can be seen in Figs. 5 and 6, the chart 58 has a soft coating 78. The chart is preferably of colored paper and the coating is preferably a white wax. It is also apparent from Figs. 5 and 6 that the small wheel or disk 64 connected on the end of the writing arm 62 is adapted to cut an impression in the wax coating on the chart. The wheel 64 is rotatably supported to the end of the writing arm 62 by a screw 80. Thus, when the arm 62 moves, the wheel rolls, this arrangement being considered superior to a rigid scribe, since it operates smoother and therefore gives a more accurate record. As shown in Fig. 7, an alternate embodiment of the wheel 82 may employ a ratchet periphery, if desired.

While it is clearly possible to employ a long chart conventionally wound on a supply reel in the apparatus of Fig. 1, the present arrangement of using a separate card for each record is considered superior, because separate records for different patients may be conveniently made and stored without having to cut off portions of a long chart to achieve this same purpose. Also, use of the illustrated form of chart clearly simplifies the apparatus.

The employment of a wax coated chart and a cutting wheel is considered superior to the normal inking pen arrangement because it eliminates the necessity for a supply of ink and because it writes positively and immediately, whereas in inking arrangements oftentimes the pen fails to write until the chart has been run for a distance. This feature also simplifies the apparatus.

Referring to Fig. 3, the electrical circuit of the apparatus includes a power circuit 84 and an actuating circuit 86. The power circuit is an alternating current circuit and is adapted to be connected by a plug 88 to a wall socket in a conventional manner. The power circuit serially includes the armature 90 of a relay switch 92, and also serially includes a manually operable on-off power switch 94. The actuating circuit is a low voltage direct current circuit deriving power from a battery 96 and is coupled to the winding 98 of the relay switch. The actuating circuit is normally open, as shown by the separated contacts 100, 102. These contacts engage the bayonets 52, 54 when the funnel structure is plugged to the case. The bayonets are electrically coupled to a further pair of separated contacts 104, 106 supported inside the tube 50.

When liquid begins to flow to the container, the liquid provides a conductive path between the contacts 104, 106 in the tube 50, thereby completing the direct current circuit through the winding 98 of the relay switch. The winding then in turn pulls in the armature 90 thereby closing the power circuit to the motor 56, if the power switch 94 is closed.

The electrical arrangement then permits the patient to automatically actuate the chart-drive by urinating into the funnel structure 42. This arrangement is considered superior to an arrangement where the patient has to manually actuate the chart drive either before or after beginning to urinate, because it is important for purposes of diagnosis that the patient urinate in his normal manner, and this might be interfered with if the patient hastened to begin urinating after turning the machine on, or had to operate a switch on the machine after he had begun urinating.

However, there are some cases in which the patient's urine is so abnormal that is is not conductive. Therefore, a manually operable actuating switch 108 is coupled across the contacts 100, 102 so that the motor may be actuated manually by an attendant, if necessary.

Low voltage D. C. power is used in the separate actuating circuit 86 in order to preclude the possibility of the patient receiving a severe shock which might happen if line power was fed across the contacts in the tube 50.

The portability of the apparatus enables the doctor to carry it with him to attend patients who are either unable or otherwise indisposed to come into the doctor's office.

I claim:

1. In apparatus for recording liquid flow, the combination which comprises weight sensitive means for supporting a container which receives the liquid and providing a changing mechanical deflection in accordance with the increasing amount of liquid received in the container, means for driving a chart on which the liquid flow is to be recorded, said driving means including an electric driving motor and an electrical circuit coupled to the motor, said electrical circuit including a circuit for conveying power to the motor and an actuating circuit, the power circuit including a switch for opening and closing the power circuit, the actuating circuit being operably coupled to the switch and having a pair of separated contacts arranged to be shorted together by the fluid as it begins to flow into the container thereby closing the switch in the power circuit and actuating the driving motor, and writing means responsive to the deflection provided by the weight sensitive means for recording liquid flow on the chart.

2. Apparatus of claim 1 wherein the power circuit is an alternating current circuit adapted to be plugged into a wall socket and serially includes the armature of a relay switch, and wherein the actuating circuit is a lower voltage direct current circuit coupled to the winding of the relay switch.

3. Apparatus for recording liquid flow comprising a case having an opening through its top, a container for receiving and retaining the liquid, weight sensitive means coupled to the case for releasably supporting the container and providing a changing mechanical deflection in accordance with the increasing amount of liquid received in the container, removable funnel means adapted to extend through the opening in the top of the case for channelling the liquid to the container, the funnel means including a collector portion, a base portion and a conduit portion extending from the base portion toward the container, means for driving a chart on which fluid flow is to be recorded, electrical means for actuating the driving means, said electrical actuating means including an electric socket coupled to the case and also including electric plug means for releasably engaging said socket and a pair of electric contacts supported inside of the base portion of the funnel means and coupled to the electric plug means, said electric contacts being arranged to be shorted together by the liquid as it flows through the base portion of the funnel means, and writing means responsive to the deflection provided by the weight sensitive means for recording liquid flow on the chart.

4. Apparatus of claim 3 wherein the electric plug means comprises a pair of substantially rigid bayonets structurally coupled to the funnel means, which bayonets engage the electrical socket in the case for releasably coupling the funnel means onto the case.

5. Apparatus of claim 3 wherein the funnel means further includes an extendable portion located between the collector portion and the base portion.

References Cited in the file of this patent

UNITED STATES PATENTS

| | | |
|---|---|---|
| 417,357 | Fergusson | Dec. 17, 1889 |
| 669,584 | Hunt | Mar. 12, 1901 |
| 991,343 | Meyer | May 2, 1911 |
| 1,235,260 | Tubesing | July 31, 1917 |
| 1,236,381 | Rogers | Aug. 7, 1917 |
| 1,262,391 | Sabol | Apr. 9, 1918 |
| 1,726,126 | Scheppmann | Aug. 27, 1929 |
| 2,176,886 | Campbell | Oct. 24, 1939 |
| 2,251,352 | Cornick | Aug. 5, 1941 |
| 2,746,832 | Blakeslee | May 22, 1956 |